UNITED STATES PATENT OFFICE 2,662,815

OXIDATION INHIBITORS

Harry W. Rudel, Roselle Park, N. J., assignor to Standard Oil Development Company, a corporation of Delaware No Drawing. Application January 7, 1949,
Serial No. 69,830

2 Claims. (Cl. 44—64)

This invention relates to an improved class of oxidation inhibitors consisting of substituted diphenyl amines or substituted nitroso diphenyl amines where the substituents constitute an ether, an alkyl linkage, or an alkyl-aryl linkage. The invention relates particularly to increasing the oxidation stability of hydrocarbon mixtures by utilization of these oxidation inhibitors. In accordance with this invention, hydrocarbon mixtures such as gasoline or lubricating oil may be inhibited against deterioration normally caused by oxidation, by incorporating therein small quantities of the oxidation inhibitors of this invention.

In a wide variety of chemical processes, products are obtained which are subject to oxidation instability. This instability may be manifested by changes in color, changes in odor, formation of precipitates, loss of active ingredients or by other undesirable phenomena. As an example, in the oil refining industry in order to prepare fuel of superior quality, it is generally necessary to stabilize the fuel against degradation which would normally occur due to oxidation of the fuel components. Thus in general, hydrocarbon mixtures falling in the gasoline or lubricating oil boiling range, if unstabilized, will over a period of time under certain conditions be subject to gum formation, sludge formation, the formation of acids and the formation of objectionable color bodies. At the present time, therefore, it is generally the practice to incorporate in a gasoline, lubricating oil, or other hydrocarbon mixtures, a suitable agent to inhibit the oxidation of these mixtures. These agents are generally called oxidation inhibitors or anti-oxidants. A wide variety of oxidation inhibitors are known and may be used for the stabilization of petroleum hydrocarbons or to stabilize other products normally oxidation unstable. In spite of the wide variety of anti-oxidants which are known, a need still exists for finding more effective anti-oxidants and for finding improved anti-oxidants for particular applications. It is, therefore, the principal object of this invention to provide a new class of anti-oxidants contemplated to be of value as oxidation inhibitors generally and particularly for the stabilization of hydrocarbon mixtures.

The oxidation inhibitors falling within the scope of this invention may best be appreciated from a general formula representative of the class of compounds embraced in this invention:

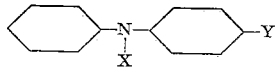

In this formula, X may be a hydrogen atom or an NO group, while Y may be hydrogen, an ether linkage, an alkyl radical, or an alkyaryl radical. Similarly, the oxidation inhibitors of this invention may consist of derivatives of the above compounds in which the hydrogen atoms on the aromatic nuclei may be substituted by substituent groups such as alkyl radicals. Preferred compounds falling within the scope of the general class of the compounds indicated are the alkylated di-aryl amines. It will be seen that these compounds are represented by the general formula given, where X constitutes a hydrogen atom and where Y constitutes an alkyl radical. A particular feature of this class of compounds is that the alkyl linkage aids in providing suitable solubility for the compounds in gasoline. Specific compounds falling within this subclass are p-isopropyl diphenyl amine, p-heptyl diphenyl amine and p,p-diheptyl diphenyl amine. A second preferred subclass of compounds falling within the scope of this invention consists of the ethers of substituted diphenyl amines. A preferred compound falling within this group is p-isopropoxy diphenyl amine and other specific examples of this group of compounds are p-ethoxy di-o-tolyl-amine or p-benzyloxy diphenyl amine. A third class of preferred compounds falling within the scope of this invention are the N-nitroso diaryl amines. Specific diaryl amines of this class are N-nitroso diphenyl amine, p-heptyl N-nitroso diphenyl amine, or p-isopropoxy N-nitroso diphenyl amine. A particular feature of this class of antioxidants is the fact that they are insoluble in alkaline or acid aqueous solutions and therefore cannot be extracted by aqueous solutions that ordinarily contaminate pipe lines and storage tanks.

As examples of this invention, the inhibiting potency of specific inhibitors selected from the above class of inhibitors will be given. In these examples, the evaluation test used was the ASTM oxidation stability test designated as ASTM-D-525-46. This test essentially consists of placing 50 cc. of the composition being tested in a bomb after which oxygen is added to provide a pressure of about 100 lbs. p. s. i. g. This bomb is then heated to about 100° C. and the pressure in the bomb is determined at 15 minute intervals. When sufficient time has passed so that the pressure drops two lbs. p. s. i. g. in 15 minutes, the test is discontinued and the time required to reach this condition is recorded as the induction period or the ASTM breakdown time ordinarily given in minutes. A material subjected to this test which is markedly unstable to oxidation will result in an ASTM breakdown time of one hour about, while an oxidation stable mixture will be characterized by breakdown times of 150 minutes or longer.

As an example of the inhibiting potency of the anti-oxidant of this invention, a variety of specific compounds were employed to inhibit diisobutylene and the breakdown times were determined according to the above identified test. It may be noted in this connection that use of diisobutylene as a testing material for oxidation inhibitors is well accepted at the present in the petroleum field. The uninhibited diisobutylene is markedly unstable giving an ASTM breakdown time of about 80 minutes while a suitably inhibited mixture of diisobutylene may be found to have a breakdown time in excess of 400 minutes.

EXAMPLE I

Diisobutylene was subjected to the ASTM test D-525-46. It was found that the diisobutylene had a breakdown time of 80 minutes.

EXAMPLE II 0.2 lb. per 5000 gallons of p-heptyl diphenyl amine was dissolved in diisobutylene. It was found that the ASTM breakdown time for this composition was 485 minutes.

EXAMPLE III

N-nitroso diphenyl amine was dissolved in diisobutylene to the extent of 0.2 lb. per 5000 gallons. It was found that this composition had an ASTM breakdown time of 485 minutes.

EXAMPLE IV

A diisobutylene composition was prepared containing 0.2 lb. of p-isopropoxy diphenyl amine per 5000 gallons of diisobutylene. The oxidation stability of this composition as determined by the ASTM oxidation stability test was 300 minutes.

EXAMPLE V

For comparative purposes, the commercially used oxidation inhibitor, N,n'-di-secondary butyl p-phenylene diamine, was tested in a diisobutylene solution. 0.2 lb. per 5000 gallons of the inhibitor was employed. It was found that the ASTM breakdown time was 390 minutes.

EXAMPLE VI

Similarly for comparative purposes, the conventional oxidation inhibitor N-butyl p-aminophenol was dissolved in diisobutylene to the extent of 0.2 lb. per 5000 gallons. It was found that diisobutylene inhibited with this quantity of anti-oxidant had an ASTM breakdown time of 400 minutes.

It is to be seen from Examples II, III and IV that the compounds of this invention provide markedly effective oxidation inhibition. As a result of these tests, it is contemplated in accordance with this invention that the class of inhibitors indicated may be used generally to stabilize oxidation unstable mixtures. It is particularly proposed that the anti-oxidants of this invention be employed to stabilize hydrocarbon mixtures such as gasoline or lubricating oils and particularly that they should be used to inhibit the class of oils known as turbine oils. Turbine oils are highly refined lubricating oils having a range in Saybolt viscosity at 210° F. from about 43 to 145 to which are added suitable anti-oxidants, rust preventives, pour depressants, V. I. improvers, metallic soaps and other additives. As stated, it is particularly contemplated that the anti-oxidants of this invention will be valuable in inhibiting the oxidation instability of turbine oils of the nature indicated. The quantity of the anti-oxidant to be used clearly depends upon the particular application of the inhibitor and may best be generally identified as that quantity which is dictated by current practices. In the case of gasoline, in general about $\frac{1}{10}$ to 1 lb. of inhibitor are employed per 5000 gallons of the gasoline. Similarly in the case of lubricating oils and turbine oils about 0.7 to 7.0 lbs. of inhibitor are employed per 100 gallons.

It is to be understood that the compositions embraced within this invention may be widely varied, for hydrocarbon compositions containing the inhibitors of this invention may also include anti-knock agents such as volatile lead-alkyl compounds, solvent oil, oiliness agents, metal deactivators, other types of anti-oxidants such as amine phenols, etc.

As further examples of the nature and application of this invention specific anti-oxidants falling within the scope of this invention were employed to inhibit gasolines. Again the test employed was ASTM test D-525-46. Two gasolines were employed, each of them constituting a blend of virgin naphtha and thermal cracked stocks. Gasoline A further contained 24 volume per cent of olefins and $\frac{1}{10}$ milliliter of tetra ethyl lead per gallon. Similarly gasoline B contained 33 volume per cent of olefins and 0.48 milliliter per gallon of tetra ethyl lead. Both gasolines were commercial blends. The results of the tests conducted are indicated in Table I below:

Table I
EFFECT OF ADDITIVES ON GASOLINE STABILITY

| Antioxodant | Concentration (#/5,000 Gal.) | ASTM Breakdown (Min.) | |
| --- | --- | --- | --- |
| | | Gasoline A | Gasoline B |
| None | | 125 | 130 |
| P-Isopropoxy Diphenyl Amine | 0.5 | 150 | 165 |
| Diphenyl Amine | 1.0 | 185 | 210 |
| Mixed Mono and Di-Heptyl Diphenyl Amines | 1.0 | 150 | 155 |

It will be noted from Table I that each of the anti-oxidants tested was effective in extending the ASTM breakdown time of the gasolines. Thus each of the inhibitors in the table, p-isopropoxy diphenyl amine and mixed mono and di-heptyl diphenyl amines, was effective in increasing the oxidation stability of the gasoline.

What is claimed is:

1. A hydrocarbon composition normally characterized by oxidation instability, and chosen from the class consisting of gasoline, lubricating oil and turbine oil, in which is dissolved an oxidation inhibiting quantity of N-nitroso diphenyl amine.

2. The composition defined by claim 1 in which the said hydrocarbon composition comprises gasoline containing about 0.1 to 1 lb. per 5,000 gallons of the said N-nitroso diphenyl amine.

HARRY W. RUDEL.

References Cited in the file of this patent

UNITED STATES PATENTS

| Number | Name | Date |
| --- | --- | --- |
| 2,109,164 | Clifford | Feb. 22, 1938 |
| 2,200,747 | Howland | May 14, 1940 |
| 2,225,368 | Craig | Dec. 17, 1940 |
| 2,354,798 | Cook et al. | Aug. 1, 1944 |
| 2,514,018 | Wachter et al. | July 4, 1950 |